United States Patent [19]
Farrington

[11] 3,879,221
[45] Apr. 22, 1975

[54] SEALED PRIMARY SODIUM-HALOGEN CELL

[75] Inventor: Gregory C. Farrington, Clifton Park, N.Y.

[73] Assignee: General Electric Company, Schenectady, N.Y.

[22] Filed: Mar. 27, 1974

[21] Appl. No.: 455,148

[52] U.S. Cl............................................. 136/83 R
[51] Int. Cl. .......................................... H01m 13/00
[58] Field of Search............ 136/83 R, 100, 20, 6 R, 136/6 LN, 6 FS, 153

[56] References Cited
UNITED STATES PATENTS

| | | | |
|---|---|---|---|
| 3,703,415 | 11/1972 | Mitoff et al. | 136/83 R |
| 3,730,771 | 5/1973 | Tannenberger et al. | 136/6 R |
| 3,762,955 | 10/1973 | Dubin | 136/83 R |
| 3,773,558 | 11/1973 | Charbonnier et al. | 136/100 R |
| 3,793,080 | 2/1974 | Hess | 136/83 R |
| 3,817,790 | 6/1974 | Mitoff | 136/83 R |

*Primary Examiner*—John H. Mack
*Assistant Examiner*—C. F. LeFevour
*Attorney, Agent, or Firm*—Paul R. Webb, II; Joseph T. Cohen; Jerome C. Squillaro

[57] ABSTRACT

A sealed primary sodium-halogen cell is disclosed which comprises a casing, an anode positioned in the casing, the anode selected from the class consisting of sodium, sodium as an amalgam, and sodium in a nonaqueous electrolyte, a solid sodium ion-conductive electrolyte positioned in the casing adjacent the anode, and a cathode positioned adjacent the opposite side of the electrolyte, the cathode comprising iodine monochloride, or iodine monochloride in a nonaqueous solvent, such as, acetonitrile, butyrolactone or propylene carbonate.

2 Claims, 1 Drawing Figure

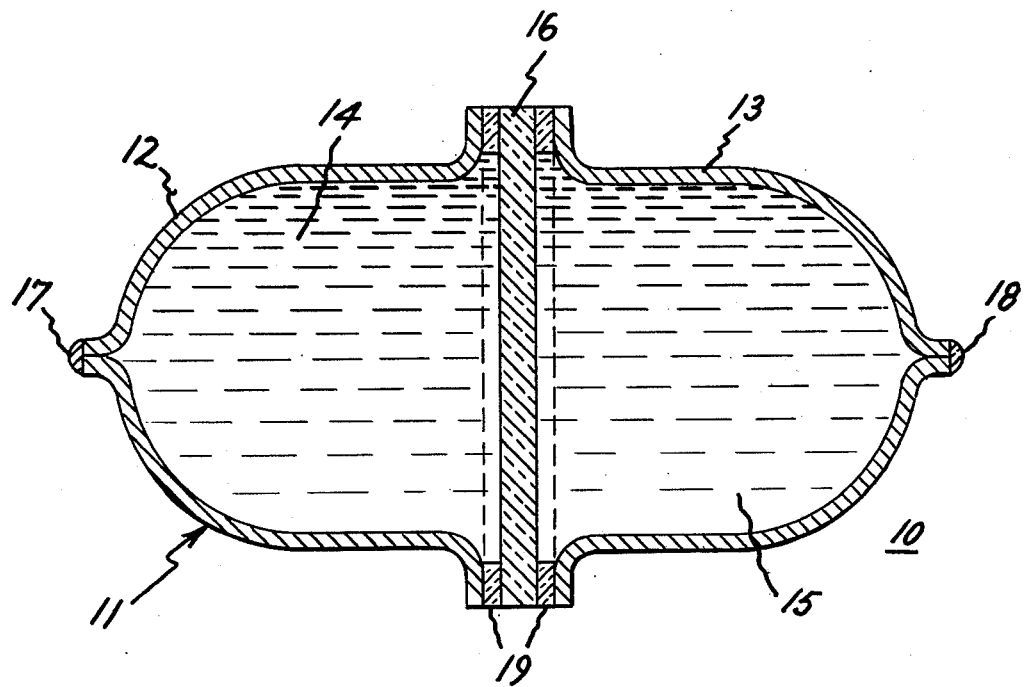

SEALED PRIMARY SODIUM-HALOGEN CELL

This invention relates to sealed primary sodium-halogen cells and, more particularly, to such cells employing a cathode of iodine monochloride, or iodine monochloride in a specific solvent.

Sodium-halogen cells are known in the prior art as, for example, described in Hess U.S. Pat. No. 3,793,080 issued Feb. 19, 1974 under the title "Sealed Primary Sodium-Halogen Battery With Bromine-Iodine Mixture". This patent describes and claims such a battery in which the cathode comprises a mixture of bromine and from 5.0 to 60 weight percent of iodine with specific conductive material, additives or both. The subject patent is assigned to the same assignee as the present application.

In copending application (RD-6946) Ser. No. 455,149, filed Mar. 27, 1974 in the names of Peter C. Lord and Gregory C. Farrington entitled "Sealed Primary Sodium-Halogen Cell", there is described and claimed such a cell which includes a cathode comprising iodine monochloride in a solvent selected from the class consisting of thionyl chloride, phosphoryl chloride, and sulfuryl chloride. This copending patent application is assigned to the same assignee as the present application.

The primary object of our invention is to provide a primary cell which has a near zero self-discharge rate, high cell voltage and high energy density.

In accordance with one aspect of my invention, a sealed primary sodium-halogen cell comprises a casing, an anode positioned in the casing, the anode selected from the class consisting of sodium, sodium as an amalgam, and sodium in a nonaqueous electrolyte, a solid sodium ion-conductive electrolyte positioned in the casing adjacent the anode, and a cathode positioned adjacent the opposite side of the electrolyte, the cathode comprising a halogen selected from the class of iodine monochloride, and iodine monochloride in a solvent.

These and various other objects, features and advantages of the invention will be better understood from the following description taken in connection with the accompanying drawings in which:

The single FIGURE is a sectional view of a battery made in accordance with our invention.

In the single FIGURE of the drawing, there is shown generally at 10 a sealed primary sodium-halogen cell embodying my invention which has a metallic casing 11 including an anode portion 12 and a cathode portion 13. An anode 14 of sodium as an amalgam is shown positioned within anode portion 12. A cathode 15 comprises a halogen selected from the class of iodine monochloride, and iodine monochloride in a solvent is positioned within cathode portion 13. A solid sodium ion-conductive electrolyte 16 is positioned between and adjacent anode 14 and cathode 15. Electrical leads (not shown) are affixed to the respective casing portions. Closed fill tubes 17 and 18 are associated with the respective portions 12 and 13. Electrolyte 16 is secured on opposite sides to portions 12 and 13 by identical glass seals 19.

A sealed primary sodium-bromine cell is formed by providing a metallic casing, providing an anode within the casing, the anode selected from the class consisting of sodium, sodium as an amalgam, and sodium in a nonaqueous electrolyte, providing a solid sodium ion-conductive electrolyte adjacent the anode, and providing a cathode adjacent the opposite side of the electrolyte, the cathode comprising a halogen selected from the class consisting of iodine monochloride, and iodine monochloride in a solvent. We found that such cells have an open circuit voltage of 3.75 volts and high energy density.

The anode may consist of sodium, a sodium amalgam or sodium in a nonaqueous electrolyte. The sodium amalgam can be in the range of compositions from about 95 percent sodium and 5 percent mercury by weight to about 35 percent sodium and 65 percent mercury. For the fully charged state of the cell, the amalgam composition is preferably high in sodium. Cells using sodium amalgams cannot be used efficiently at temperatures below 21.5°C due to complete freezing of the amalgam.

The use of electrolytes permits cell operation to much lower temperatures as determined by the freezing point of the electrolyte. A preferred electrolyte is propylene carbonate in which a sodium halide salt is dissolved. This electrolyte permits cell operation down to 0.°C.

The cathode comprises a halogen selected from the class consisting of iodine monochloride, and iodine monochloride in a nonaqueous solvent selected from the class consisting of acetonitrile, butyrolactone, and propylene carbonate.

We found unexpectedly that iodine monochloride is a desirable cathode with a sodium type reactant. The iodine monochloride can be used alone as the cathode or it can be mixed with a solvent. When a solvent is employed the iodine monochloride is present from 1.0 to 99.0 weight percent with the solvent present as the balance. When iodine monochloride is employed as the cell cathode, the cell operates over a temperature range of 14°C to 96°C. When iodine monochloride alone is mixed with one of the above solvents, the cell performs from 0°C to 100°C. In a room temperature application, sodium amalgam or sodium in a nonaqueous electrolyte is employed as the anode.

The anode casing portion can be made of nickel, Kovar alloy, niobium or tantalum, while the cathode casing portion should preferably be niobium or tantalum. These metals have been shown to be chemically stable in their respective environments.

A method of hermetically sealing the anode and cathode portions of the casing to opposite sides of the solid electrolyte is described and claimed in copending patent application Ser. No. 148,793, filed June 1, 1971, under the title "Method of Forming a Metallic Battery Casing" in the name of Stephan P. Mitoff. This copending application is assigned to the same assignee as the present application.

In the above method, a disc of solid sodium ionconductive electrolyte, for example, sodium beta-alumina, has stacked thereon a ring of General Electric Company 1013 glass cut from tubing. The glass ring has approximately the inside and outside diameter of the cup lip of casing portion. On the glass ring is stacked the nickel anode portion in cup form with its lip adjacent the ring. The three components are positioned on a supporting jig and lowered into an inert atmosphere furnace at 1000°C for about one minute. The resulting seal is helium leaktight. The process is repeated to seal the cathode portion to the opposite surface of the solid electrolyte. Both anode and cathode portions can also be sealed simultaneously to the disc in the above manner. It will be appreciated that other cell configurations can be employed.

The anode portion can be filled with sodium, sodium as an amalgam or sodium in a nonaqueous electrolyte through tube 17 after which the tube is sealed, as for example, by welding. The cathode portion is filled with iodine monochloride, or with iodine monochloride in a solvent through tube 18, after which the tube is similarly sealed. The resulting device is a sealed, primary sodium-halogen cell. Leads (not shown) are attached to the respective casing portions for operation of the battery.

Examples of primary sodium-halogen cells made in accordance with my invention are set forth below:

EXAMPLE 1

A vented cell was constructed which employed a glass casing consisting of an anode portion and a cathode portion. A platinum wire extended into each casing portion. The portions were separated by a solid sodium beta-alumina electrolyte disc. The anode portion was then filled with a sodium amalgam of a composition of 90 weight percent of sodium and 10 weight percent of mercury. A mixture of iodine monochloride and acetonitrile was added to the cathode portion. The resulting device was a primary sodium-halogen cell. An open circuit voltage of 3.75 volts was obtained.

EXAMPLE 2

The cell of Example 1 exhibited at 25°C the following polarization behavior which is shown below in Table 1.

TABLE I

| Voltage-Volts | Current Density-ma/cm$^2$ |
|---|---|
| 3.75 | 0 |
| 3.0 | 0.3 |
| 2.4 | 0.9 |
| 2.0 | 1.4 |

While other modifications of the invention and variations thereof which may be employed within the scope of the invention have not been described, the invention is intended to include such as may be embraced within the following claims.

What I claim as new and desire to secure by Letters Patent of the United States is:

1. A sealed primary sodium-halogen cell comprising a casing, an anode positioned in the casing, the anode selected from the class consisting of sodium, sodium as an amalgam, and sodium in a nonaqueous electrolyte, a solid sodium beta-alumina ion-conductive electrolyte positioned in the casing adjacent the anode, and a cathode positioned adjacent the opposite side of the electrolyte, the cathode comprising a halogen selected from the class consisting of iodine monochloride, and iodine monochloride in a nonaqueous solvent selected from the class consisting of acetonitrile, butyrolactone and propylene carbonate.

2. A sealed primary sodium-halogen cell as in claim 1, in which the iodine is present from 1.0 to 99.0 weight percent and the balance is the solvent.

* * * * *